July 8, 1958  J. H. HOLAN ET AL  2,841,960
FLUID PRESSURE CONTROL SYSTEM
Original Filed Jan. 18, 1954  7 Sheets-Sheet 1
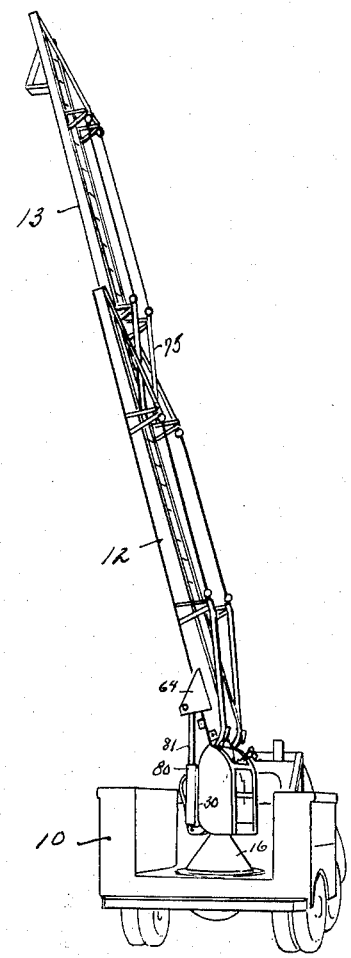
Fig. 1
Fig. 2
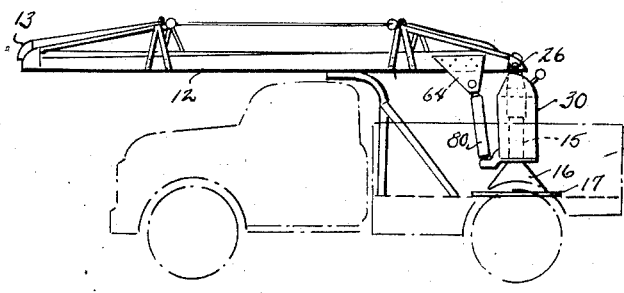
INVENTORS
JAMES HOWARD HOLAN
HERMAN J. TROCHE
BY
Attorneys

INVENTORS
JAMES HOWARD HOLAN
HERMAN J. TROCHE
BY

Attorneys

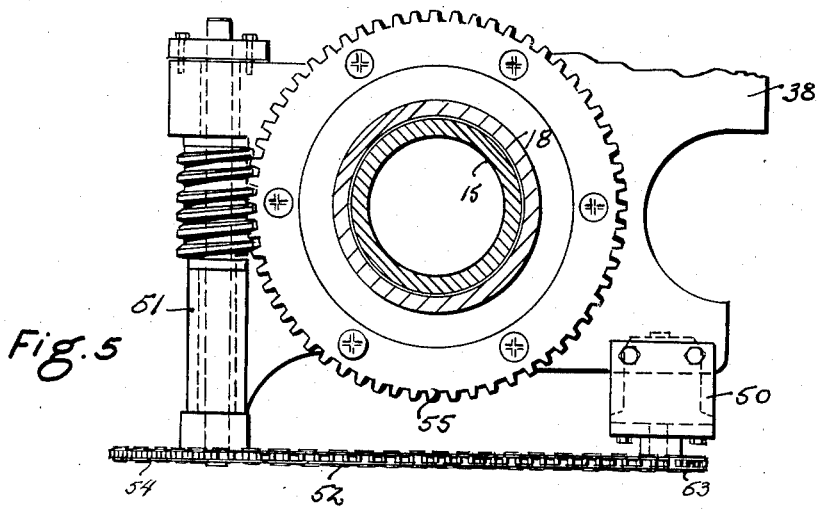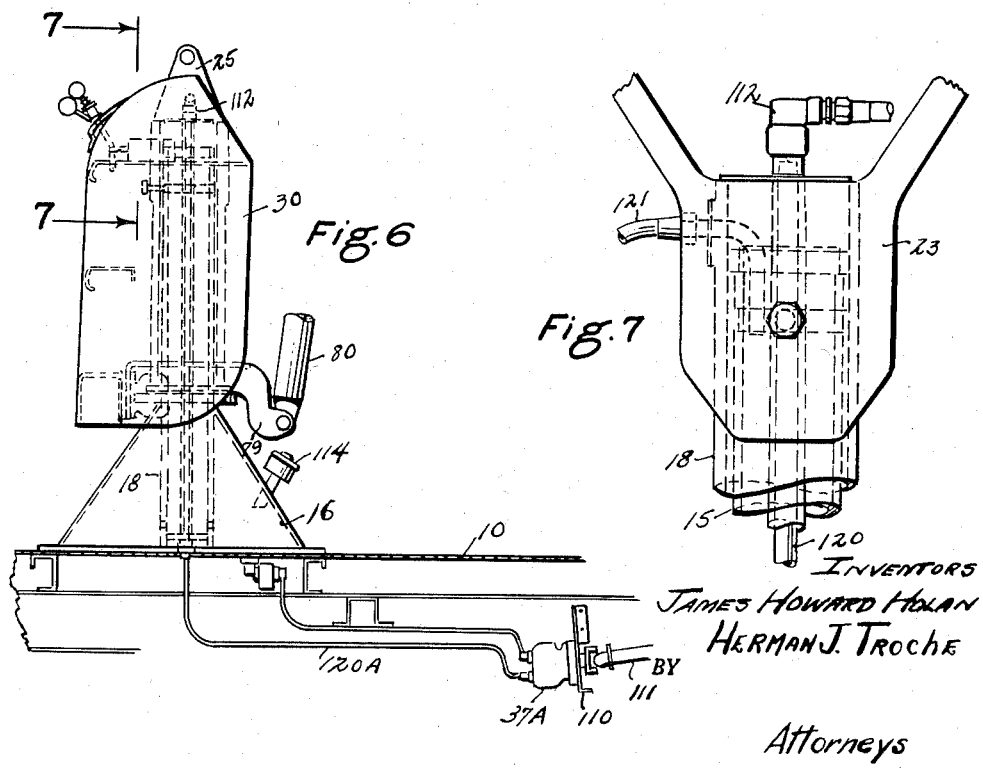

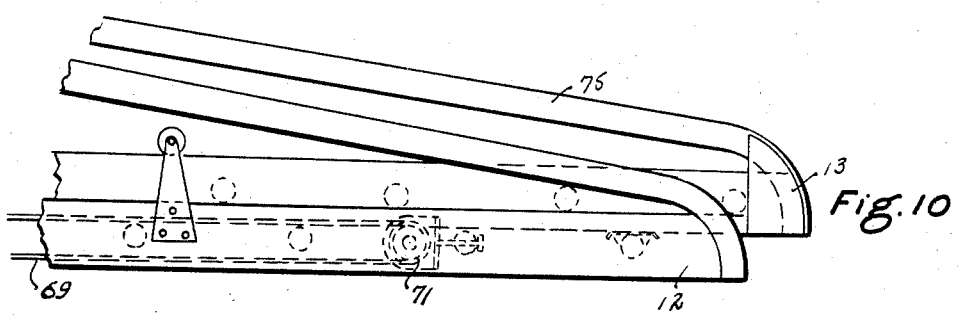
Fig. 10
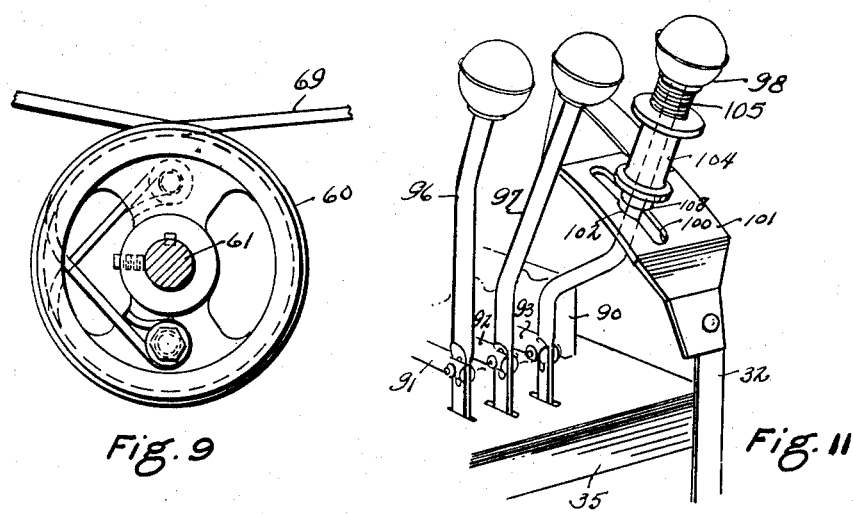
Fig. 9
Fig. 11
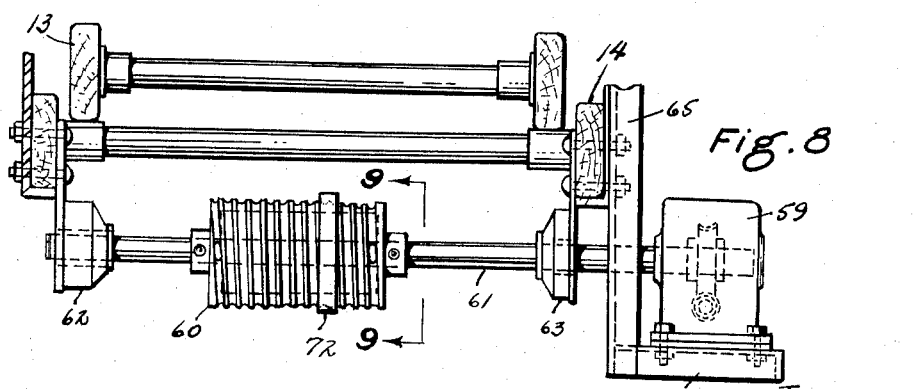
Fig. 8
INVENTORS
JAMES HOWARD HOLAN
HERMAN J. TROCHE
BY
Attorneys July 8, 1958    J. H. HOLAN ET AL    2,841,960
FLUID PRESSURE CONTROL SYSTEM
Original Filed Jan. 18, 1954    7 Sheets-Sheet 7

INVENTORS
JAMES HOWARD HOLAN
HERMAN J. TROCHE
BY

Attorneys

United States Patent Office 2,841,960
Patented July 8, 1958

2,841,960

FLUID PRESSURE CONTROL SYSTEM

James Howard Holan, Rocky River, and Herman J. Troche, Fairview Park, Ohio, assignors to J. H. Holan Corporation, Cleveland, Ohio, a corporation of Ohio Original application January 18, 1954, Serial No. 404,462. Divided and this application October 11, 1954, Serial No. 461,356

4 Claims. (Cl. 60—97)

This invention relates to an aerial extension ladder for a utility vehicle or the like which is swingable and tiltable with reference to the vehicle for obtaining access to overhead traffic lights, street lamps and similar objects. The invention is more particularly directed to the unitary mounting of such ladder on a vehicle support along with fluid pressure actuated mechanism for automatically effecting the ladder movements in accordance with the selective operation of a fluid pressure control system.

The design and construction of a vehicle having an aerial ladder of the type indicated requires consideration of many factors, including flexibility of movement within the limited space of the vehicle in an efficient and safe manner. Independent operation of various mechanisms for effecting different ladder movements requires constant attention by an operator and inherently results in a lack of coordination between the respective movements. Accordingly, it is a principal object of this invention to provide a highly flexible aerial ladder for a vehicle which can be automatically moved to different positions relative to the vehicle in an efficient and coordinated manner.

Briefly in accordance with this invention there is provided a wheeled vehicle having an aerial ladder movably mounted on a common support along with suitable mechanism for automatically elevating, extending, and rotating the ladder. The mechanism may be selectively actuated by fluid pressure which is supplied from a control system integrally carried by the ladder mounting. In one embodiment, the source of pressure is provided by an engine driven pump carried by the ladder mounting while another embodiment utilizes a power take-off arrangement from the vehicle drive to operate a pump for supplying fluid pressure to the control system. The present application is a division of our application for Letters Patent of the United States, Serial No. 404,462 filed January 18, 1954 for Aerial Ladder.

In the drawings:

Fig. 1 is a rear view of a motor vehicle having an aerial ladder extended in working position;

Fig. 2 is a side view of the vehicle illustrating the aerial ladder in its carrying position on the vehicle;

Fig. 5 is a view taken along the lines 5—5 in Fig. 3;

Fig. 6 is a side view of the ladder mount illustrating an embodiment utilizing a power take-off from the vehicle drive;

Fig. 7 is a partial view of the top of the ladder mount taken along the line 7—7 in Fig. 6;

Fig. 8 is a partial view of the nested ladder sections taken along lines 8—8 in Fig. 4 to illustrate the ladder extension mechanism;

Fig. 9 is a view taken along the lines 9—9 in Fig. 8 to show the disposition of the ladder extension cables about the drum;

Fig. 10 is a side view of the forward end of the nested ladder;

Fig. 11 is a partial perspective view of a portion of the ladder mount illustrating the mechanism operating levers;

Figure 3:
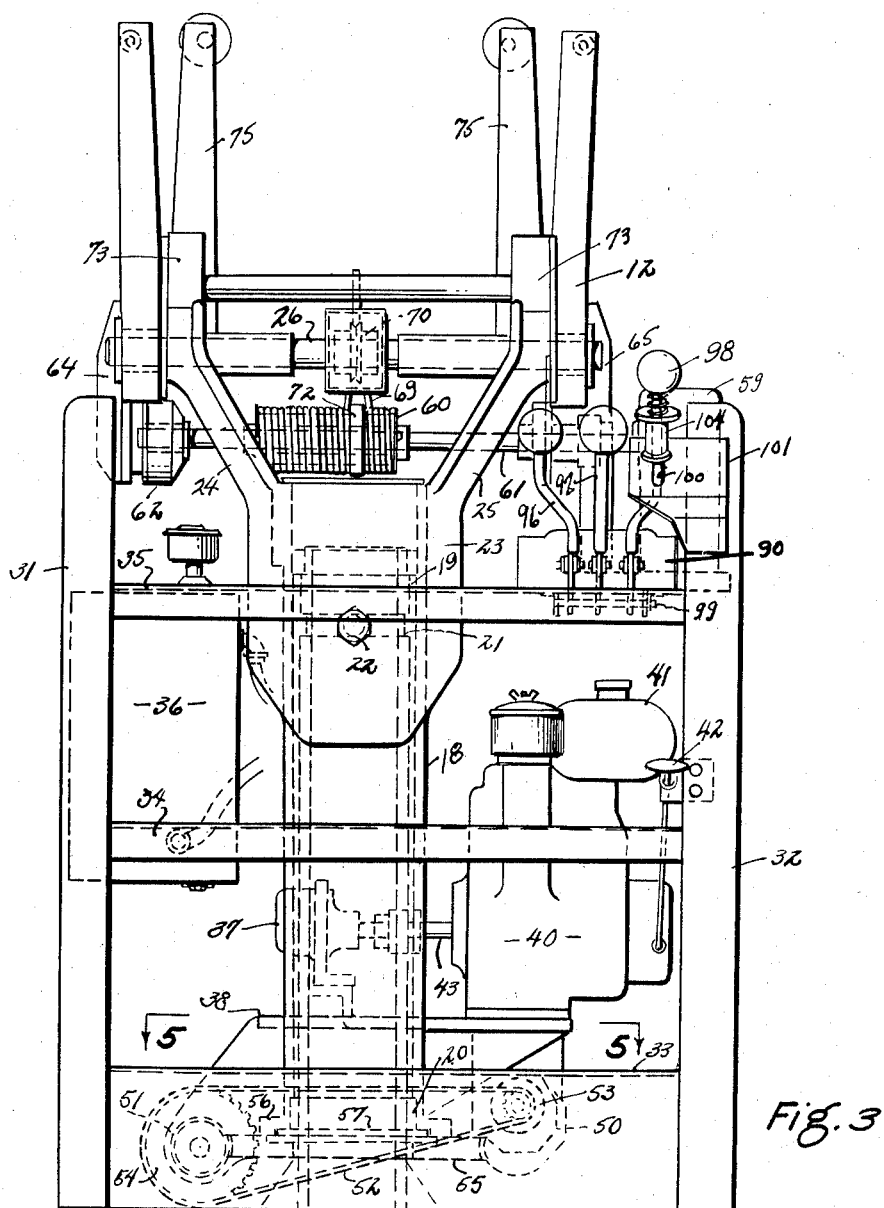
Fig. 3 is an enlarged rear view of the ladder mount.

Referring now to Figs. 1 and 2 of the drawings, there is shown a motor vehicle having a truck body portion with an aerial ladder operatively supported in working position to provide access to some overhead object as in Fig. 1 or otherwise supported in carrying position as in Fig. 2. The ladder is of the extendable type comprising a pair of relatively movable ladder sections which coact in telescoping relation with each other in the customary manner and, for purposes of description, the lower section 12 will be referred to as the base ladder section and the extended section 13 will be referred to as the fly section.

The base section 12 of the ladder is operatively supported on a column 15 which is optimumly located on the truck body 10 in such manner that the extensible ladder can be elevated in a vertical plane and the entire ladder assembly can be rotated on a vertical axis relative to the truck body. The column 15 is preferably tubular in form and projects upwardly from a pedestal base 16 that is rigidly secured to the floor of the truck body through a marginal flange 17. The column 15 rotatably supports a sleeve 18 which carries the ladder and a frame carriage 30.

Figure 4:
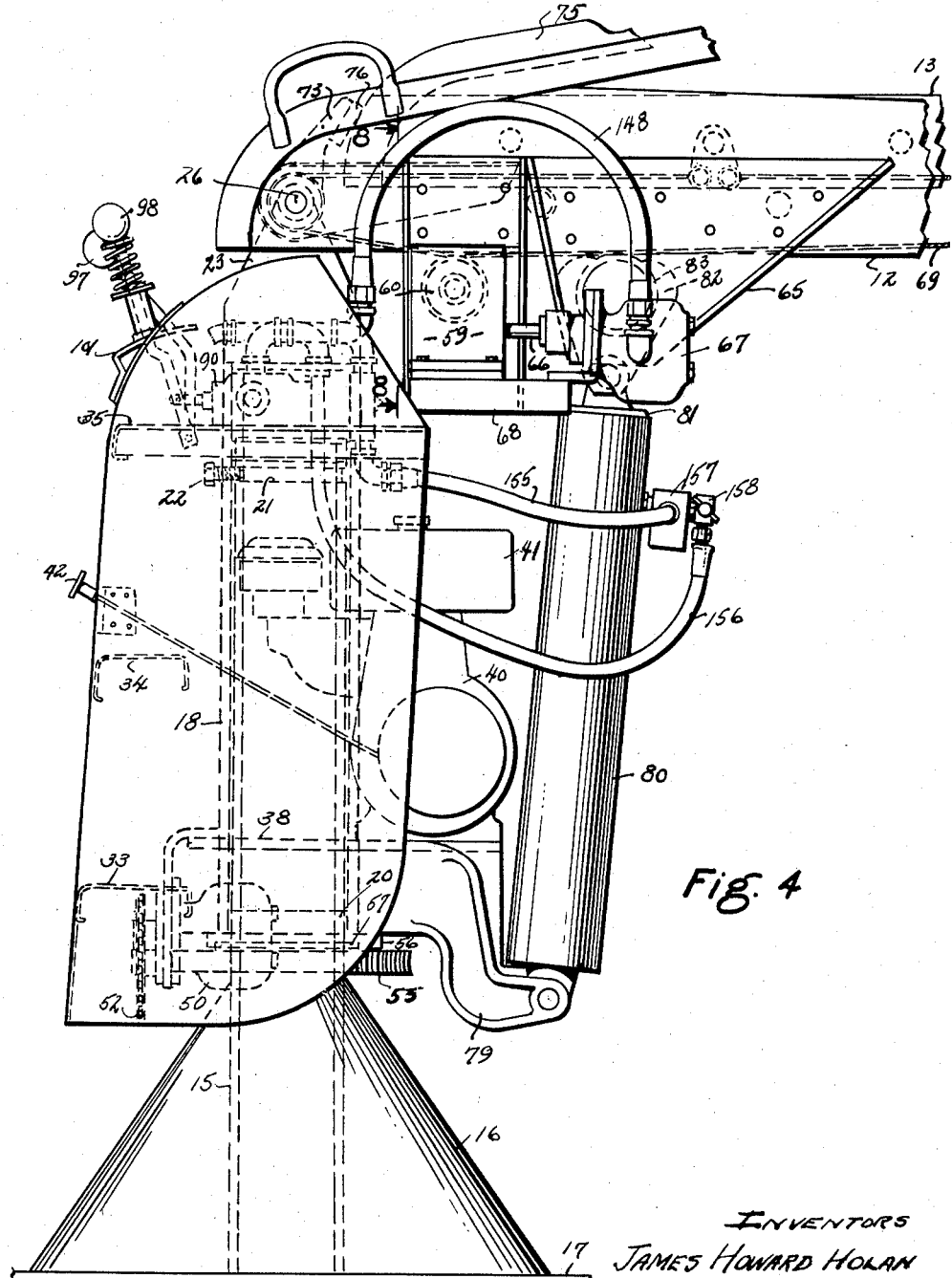
Fig. 4 is a side view of the ladder mount, illustrating a portion of the ladder and its elevating mechanism.

The ladder mounting is shown in greater detail in Figs. 3 and 4 of the drawings as including upper and lower sleeve bearings 19 and 20 for rotatably supporting the sleeve 18 on the column 15 and at the same time distributing the load stresses along a considerable length of the column. The column has a circumferential groove 21 adjacent the top which receives a locking stud 22 carried by the sleeve 18 to permit locking the sleeve and its assembly in fixed position on the column. The upper end of the sleeve 18 carries a ladder supporting yoke 23 having spaced upwardly projecting arms 24 and 25 forming a trunnion cradle for receiving a pivot shaft 26 whose extremities support the lower end of the base ladder section 12. This arrangement permits the ladder to be tilted in a vertical plane about its lower end in a manner to be hereinafter more fully described.

The frame carriage 30, which is carried by the rotatable sleeve 18 is constructed with side plates 31 and 32 separated by transverse steps 33, 34 and 35 to provide access from the truck body upwardly to the ladder at the top of the column. The carriage 30 has other supporting platforms upon which are mounted mechanisms for positioning the carriage and the ladder. In their preferred form, the positioning mechanisms are intended to be hydraulically actuated from a source of hydraulic pressure which, in the embodiment shown in Figs. 3 and 4 is integrally supported on the carriage frame and includes a reservoir 36 of hydraulic fluid such as oil or the like and an engine driven pump 37 mounted on a platform 38. In Fig. 3 the motive power takes the form of a combustion engine 40 which is also mounted on the platform 38 along with a fuel tank 41 and starting cable 42 and has its drive shaft 43 operatively coupled to the pump 37. The pump is connected between the reservoir and the various hydraulically operated mechanisms through suitable oil lines in accordance with the control system to be hereinafter more fully described in conjunction with Figs. 12 through 14 of the drawings.

One positioning mechanism operates to rotate the sleeve 18 and its superstructure assembly on the column 15 and includes a conventional hydraulic motor 50 mounted on the platform 38. The motor 50 is intended to drive a worm shaft 51 through a sprocket arrangement including the sprocket belt 52 and the spaced sprocket wheels 53 and 54. As best shown in the planular view of Fig. 5, the worm shaft 51 engages a worm gear 55 which is keyed or otherwise fixedly supported on the column 15 at the lower extremity of the sleeve 18. Returning to Figs. 3 and 4, it is seen that the sleeve 18 has an annular flange 56 which coacts through the lower sleeve bearing 20 and against a thrust washer 57 supported on the worm gear 55 for rotation on the column 15 in response to driving engagement between the driven worm shaft 51 carried by the carriage 30 and the fixed worm gear 55. Since the carriage 30 and the ladder are each carried by the sleeve 18, they will rotate with the sleeve whenever the motor 50 is operated.

Another one of the positioning mechanisms is a hydraulically driven winch for extending the fly section 13 of the ladder relative to the base ladder section 12. The winch takes the form of a cable drum 60 mounted on a shaft 61 suitably journaled in end bearings 62 and 63 carried by side brackets 64 and 65 of the corresponding side rails of the ladder base section 12 (Fig. 8). One extremity of the shaft 61 extends into a speed changing gear box 59 for driving engagement with a worm shaft 66 that is driven by another hydraulic motor 67, which, in turn, is powered by means of hydraulic fluid being supplied through suitable lines in the control system of Fig. 12. The extension hydraulic motor 67 and its speed changing mechanism are mounted on a platform portion 68 of the bracket 65 and are adapted to be tilted with the ladder for driving coaction with the cable drum 60 in any tilted position of the ladder.

The cable drum 60 carries a cable 69 that extends about a cable sheave 70, which is rotatably mounted on the ladder pivot shaft 26, and then loops about an upper pulley 71 (Fig. 10). The ends of the cable 69 are reversely wound about the cable drum 60 on either side of a separator 72 and then are secured to the fly section 13 to extend and retract the fly section relative to the base ladder section 12 in the customary manner whenever the extension motor 67 is operated.

An additional feature of this invention resides in the provision of a device for engaging and holding the ladder fly section 13 in fixed retracted position against the base section 12. This device takes the form of a pair of arms 73 each of which is fixedly attached to one of the side rails of the lower ladder section 12 and sloped in a forward direction so that they will engage the rear curved surface of the fly section truss rod 75 when the fly section 13 is in retracted position as shown at the top of Fig. 4. In its preferred form, each arm 73 is provided with a resilient pad 76 of rubber or the like which will wedge into semi-locking position against the curved rear portion of the fly section truss rod to prevent relative movement and rattling between the sections in their carrying position.

Referring again to Fig. 4 of the drawings, it will be seen that the platform 38 also has a bracket arm 79 which pivotally supports the lower extremity of a ladder elevating mechanism in spaced relation from the ladder pivot axis. The elevating mechanism includes a cylinder 80 having its external end pivotally coupled to a lever arm 82 on a cross member 83 extending between side brackets 64 and 65 carried by the base ladder section 12. The piston 81 is intended to be hydraulically positioned axially within the cylinder 80 by means of hydraulic pressure to provide a lift for elevating the ladder about its pivot axis to any working position in a vertical plane.

Figure 12:
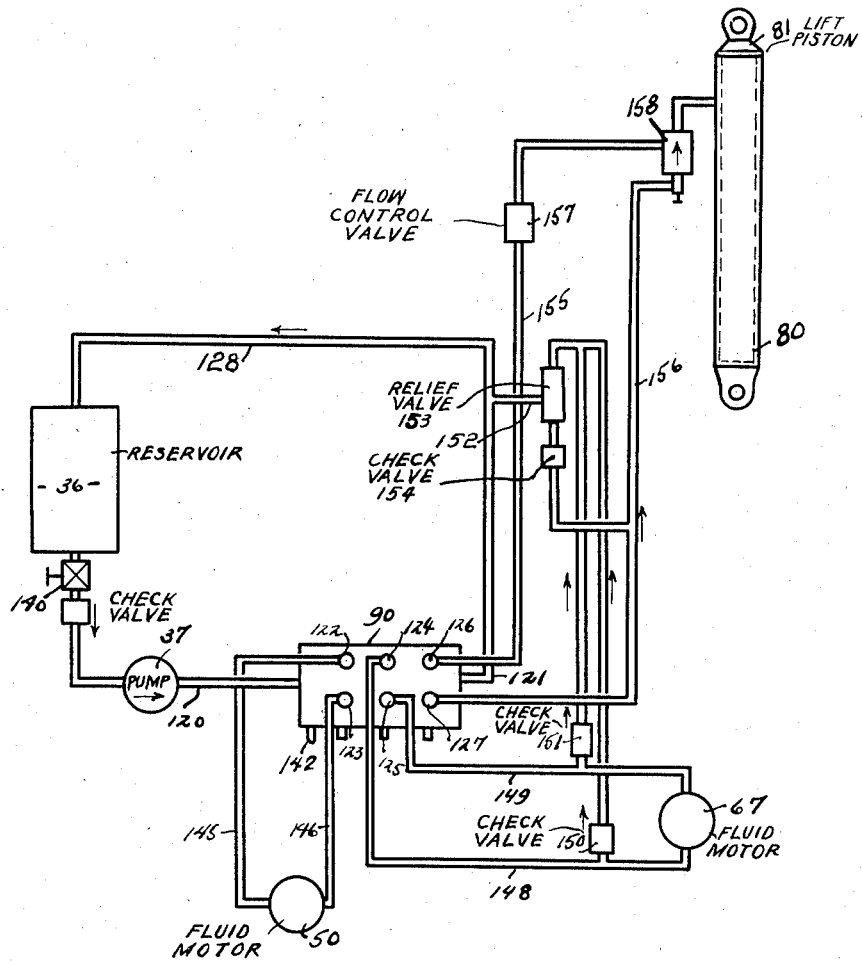
Fig. 12 is a diagrammatic illustration of a fluid pressure control system for operating the ladder.
Figure 14:
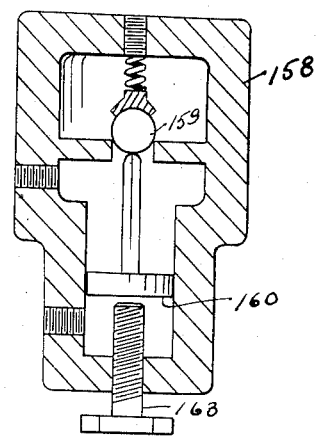
Fig. 14 is a sectional view of a check valve having an emergency release for the elevating portion of the control system.

As hereinbefore noted, the hydraulically actuated mechanisms for rotating the ladder assembly about the supporting column 15 and for extending and elevating the ladder are intended to be selectively actuated by means of the control system shown in Figs. 12 and 14. This system includes a multiple plunger throttling valve which has a central control block 90 provided with slide valve plungers 91, 92 and 93 that are movable within the control block to apply or remove hydraulic fluid from the pump 37 to the respective operating mechanisms in accordance with the operation desired. As best shown in Figs. 3 and 4 of the drawings, the control block 90 is positioned on an upper carriage platform extending forwardly from the top access step 35 and the plungers are provided with operating levers 96, 97 and 98 which can be manually operated from the truck body 10. It will be noted that each of the operating levers has a pivotal connection to the corresponding valve plunger and has an apertured extremity projecting below such pivotal connection through slots in the access step 35 for rotation about a fixed bar 99.

One of the operating levers 98, corresponding to the actuation of the lift piston 81, has its upper extremity extending through a slot 100 in a guide bracket 101 mounted on the carriage side plate 32 and includes mechanism intended to operate as a dead-man control. This arrangement is best shown in perspective in Fig. 11 of the drawings where the guide bracket slot 100 is shown as having an enlarged central portion 102 for receiving the extremity 103 of a spring biased locking sleeve 104. The sleeve extremity 103 has a greater dimension than the guide slot 100 and, when aligned with the enlarged portion 102, will be pressed into locking engagement therein by the spring 105. The locked position of the operating lever 98 corresponds to the neutral position of the corresponding valve plunger 93 and prevents and inadvertent operation of the lift piston 81 as will be hereinafter more fully described.

The embodiment, shown and described in Figs. 3 and 4 of the drawings, is provided with a self-contained source of power, such as the combustion engine 40, which is carried by the carriage 30 to drive the pump 37 and provide the necessary fluid pressure in the hydraulic control system. In this embodiment, the entire carriage assembly, including the power source and all the operating mechanism, rotates as a unit with the ladder and the sleeve 18 on the column 15 to provide an extremely flexible aerial ladder which is easily controlled for rapid and accurate spotting of workmen and tools. In practice, the entire ladder assembly can be rotated through a full 360° sweep and elevated to an infinite number of tilted positions, to a maximum limit determined by the lift piston extension. All of the movements, including the ladder extension, are hydraulically powered from a balanced support which serves the further purpose of housing the complete hydraulic system and power source.

In Figs. 6 and 7 of the drawings, there is shown an alternative arrangement where, instead of an integral power source such as a combustion engine mounted on the carriage assembly, the hydraulic control system is coupled to a suitable power take-off from the motor vehicle drive. As best shown in Fig. 6, the power take-off includes hydraulic fluid lines which extend centrally through the tubular column 15 from a pump 37A which is mounted on a bracket 110 below the floor of the truck body for driving coaction with a coupling to the take-off drive shaft 111.

Since the entire ladder mounting assembly, including the hydraulically actuated positioning mechanisms, rotate as a unit about the supporting column 15, it is necessary to provide a swivel fitting 112 for the fluid supply line 120 as shown in Fig. 7. With the power take-off arrangement shown in Fig. 6, the pedestal base 16 may be utilized as the hydraulic fluid reservoir with a suitable access fitting 114 and the return fluid line 121 can communicate with the reservoir in the base 16 through the tubular column 15 for rotation with the ladder mounting assembly. This arrangement permits full 360° rotation of the entire ladder mounting assembly without interference from hydraulic fluid lines which are connected to a remotely located pump coupled to the vehicle drive.

Figure 13:
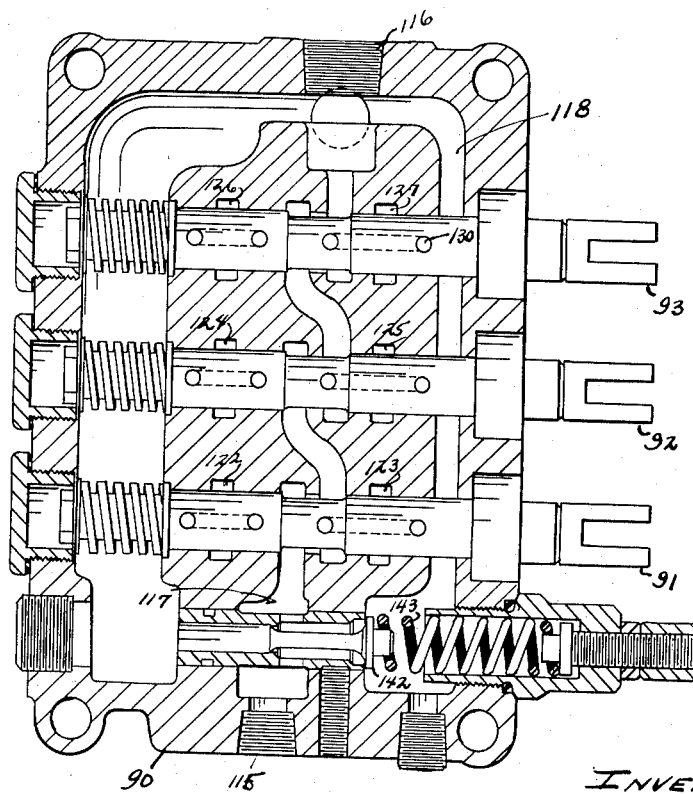
Fig. 13 is a sectional view of the multiple plunger throttling valve for the control system of Fig. 12.

Referring now to Figs. 12 and 13 of the drawings, there is diagrammatically shown in Fig. 12 a preferred hydraulic fluid control system and in Fig. 13 a cross sectional view of the central control block 90 illustrating the manner in which the slide valve plungers 91, 92 and 93 apply fluid pressure from the pump 37 to the respective hydraulically powered ladder positioning mechanisms. Referring particularly to Fig. 13, it is seen that the valve plungers are intended to be axially positioned in the control block and are spring-biased at their inner extremity to maintain a neutral position. The block 90 is provided with an inlet 115 at one end and an outlet 116 at the other end connected by an irregular central passage 117 through the block which will permit fluid pressure to pass when all of the valve plungers are in a neutral position. The block includes access ports 122 through 127 paired on opposite sides of the central passage 117 for each plunger so that the ports of each pair can be alternately coupled to the fluid pressure in the central passage 117 or to the surrounding discharge passage 118. Such alternate coupling may be accomplished by counter-boring each of the valve plungers between axially spaced transverse apertures 130 which can be positioned to apply or remove fluid pressure from the access ports of the control block.

The operation of the valve plungers in the control block 90 will be more conveniently described in connection with the control system shown in Fig. 12 of the drawings which includes, in addition to the control block 90, the reservoir 36, the pump 37, the hydraulic rotation and extension motors 50 and 67, the hydraulic lift 80, 81 and suitable control and check valves. The main shut-off valve 140 permits hydraulic fluid to pass from the reservoir 36 to the pump 37, which is driven by the engine 40 or by the power take-off of Figs. 6 and 7, to apply fluid pressure to the supply line 120 and thence to the control block inlet 115. When each of the valve plungers 91, 92 and 93 are in their neutral position, the central passage 117 is open through the block 90 and the hydraulic fluid will flow through the block and the return line 121 to the reservoir 36 to complete the circulatory system. As best shown in Fig. 13, the control block 90 carries a relief valve 142 which operates to prevent the building up of excess fluid pressure. Thus, for example, whenever the flow to anyone of the hydraulic mechanisms is terminated, the excess pressure acting on the enlarged piston area will position the relief valve 142 against the spring bias 143 to by-pass the fluid from central passage 117 to the outer discharge passage 118 for return to the reservoir 36.

The rotation motor 50 is coupled by suitable lines 145, 146 to the paired access ports 122, 123 of the first valve plunger 91 which can be positioned to the left or right to apply hydraulic fluid pressure for rotating the motor in either direction, thereby causing rotation of the entire ladder mounting assembly in either direction on the supporting column 15. No additional relief lines are necessary for the rotation drive, since it operates for a full 360°. Of course, if the fluid operating pressure exceeds the maximum allowable pressure, the main relief valve 142 in the control block 90 would open and release such pressure to protect the rotation drive.

The hydraulic winch and ladder extension motor 67 is similarly coupled through lines 148, 149 to the paired access ports 124, 125 of the second valve plunger 92 and is protected on either side by suitable check valves 150, 151 and a relief line 152 which includes a conventional relief valve 153 and check valve 154 establishing communication with the return line 128 to the reservoir 36. The relief valve 153 will be set for a predetermined safe release of the ladder when the load exceeds a safe limit.

The lift piston cylinder 80 is coupled across the last valve plunger 93 through lines 155, 156 and flow control valve 157 and check valve 158. To elevate the ladder, the valve plunger 93 is positioned to the right to permit fluid pressure to be applied through access port 126 to the line 155 leading to the flow control valve 157 and thence through the check valve 158 to the lift cylinder 80. The flow control valve 157 may be of any conventional type, while the check valve 158 is preferably of the type shown in Fig. 14 of the drawings. As hereinbefore noted in connection with Fig. 11 of the drawings, the lift operating lever 98 includes a dead-man control arrangement which automatically positions and locks the corresponding valve plunger 93 in a neutral position once the ladder has been elevated to the desired angle. Retraction of the elevated ladder is accomplished through the same path which elevated the ladder by moving the operating lever 98 to position the valve plunger 93 to the left. This places the lift cylinder inlet line 155 in communication with the return line 128 and, although the lift cylinder 80 is normally isolated from the return line 128 by check valve 158, the same position of the valve plunger 93 applies fluid pressure through access port 127 and line 156 to the underside of the check valve piston 160 which operates against the ball-check 159 to open the return path for the fluid pressure in the lift cylinder 80. The lift piston 81 and ladder are then automatically retracted from their elevated position under the influence of the ladder load. The line 156 is preferably connected to the relief valve 153 and the check valve 158 includes an emergency release for the ladder in the form of a hand-operated press rod 163 which can be manually positioned to engage the piston 160 to open the ball check 159.

Thus, there has been provided an extremely flexible aerial ladder having hydraulically powered movements which may be automatically controlled for rapid and accurate spotting of workmen and tools. The hydraulic pump may be powered by an engine integral with the ladder mounting or by a truck mounted power take-off to operate a rotation drive through an unlimited swing, to elevate the ladder through an infinite number of positions in its working range, and to drive a ladder extension winch. All of the movements are accomplished by operating a conveniently located multiple plunger motor control valve in a control system provided with pre-set relief lines and valves for safe operation.

We have shown and described what we consider to be the preferred embodiments of our invention, along with suggested modified forms, and it will be obvious to those skilled in the art that other changes and modifications may be made without departing from the scope of our invention as defined by the appended claims.

I claim:

1. In a fluid pressure control system for a movable aerial extension ladder supported on a frame carriage which is rotatably mounted on a pedestal-like support and having independent motor-operated means for rotating, extending and tilting the ladder respectively, said system including a multiple plunger control valve comprising a valve block having access ports operatively connected to said means with the plungers being axially movable within the block from neutral to operative position for coaction with said ports for selectively actuating said means, and wherein each of said plungers is provided with one extremity extending externally of the block and means within the block normally biasing each of the plungers to a neutral position, the combination of, a plurality of operating levers, each pivotally coupled intermediate its ends to the external extremity of a corresponding valve plunger for actuating the latter in said axial direction, a fixed footing on said frame carriage, one end of said levers being pivotally supported on said fixed footing and the other end of each lever being accessible for manipulation by an operator, a fixed bracket on said carriage having an elongated slot for receiving and guiding one of said levers in its movement, and means movable generally axially of said one lever and automatically urged into coaction with said bracket to lock said last-mentioned lever in neutral position.

2. The apparatus of claim 1, wherein said last-mentioned means includes a sleeve freely supported for axial movement along said one operating lever, said bracket slot being generally linearly extending and being enlarged at an intermediate portion corresponding to the neutral lever position, said sleeve diameter exceeding the width of the slot except for the enlarged portion and adapted to seat therein, and means coacting between said lever and the sleeve to normally urge the sleeve axially against the bracket.

3. A fluid pressure control system for a movable aerial extension ladder comprising independent motor operated means for rotating, extending and tilting the ladder respectively, a plurality of fluid pressure motors, a fluid pressure actuated lift piston and cylinder, a reservoir of operating fluid having a main supply and a return line, a driven pump operatively coupled into the supply line, a multiple plunger motor control valve connecting the main supply and return lines, a plurality of branch lines independently connecting each of said motors and said lift piston cylinder to the motor control valve for selective coupling by a corresponding plunger of said motor control valve between the main supply and return lines, said branch lines for connecting the lift piston cylinder to the motor control valve including a lift supply line and an auxiliary line adapted for alternate coupling to the main supply line according to the operative position of the corresponding plunger, said lift supply line being coupled to the return line when said auxiliary line is coupled to the main supply line, a check valve in said lift supply line normally operative to prevent a reverse fluid flow from the lift piston cylinder, pressure responsive means coupled to said auxiliary line and coacting therewith to render said check valve inoperative, whereby the lift piston load operates against the supporting fluid through the return line to lower the piston in the cylinder, and manually operable means to directly actuate said pressure responsive means for rendering said check valve inoperative.

4. A fluid pressure control system for an aerial ladder comprising in combination, a multiple plunger motor control valve having a valve block provided with a fluid pressure inlet and outlet, said valve block having also a plurality of ports adapted to be opened and closed by positioning corresponding valve plungers away from a neutral inoperative position, a pair of hydraulic motors each connected through suitable conduits to ports corresponding to different plungers, externally accessible means for independently positioning each plunger in either direction from its neutral position to permit opposite flow of fluid pressure therethrough respectively, a reservoir of operating fluid having a fluid pressure line communicating with the valve block inlet and a return line from the valve block outlet, a driven pump operatively coupled in the supply line, a lift piston and cylinder having a fluid pressure supply line coupled to a port controlled by one position of a third plunger in said valve block, said lift supply line having check valve means permitting flow of fluid in only the lift operating direction, an auxiliary fluid pressure line having one end coupled to another port controlled by another position of said third plunger and having the other end operatively coupled to apply fluid pressure to reverse the action of said check valve means and permit a return flow of fluid pressure through the lift supply line and the reservoir return line under the influence of the lift piston load, said third plunger also coacting to couple said return line to the lift supply line port in said other position, and a relief line including a relief valve for by-passing the pump pressure from said auxiliary line and at least one of said motors to the reservoir return line when the fluid pressure exceeds a predetermined amount.

References Cited in the file of this patent

UNITED STATES PATENTS

| | | |
|---|---|---|
| 1,330,860 | Gale | Feb. 17, 1920 |
| 2,228,568 | Johnson | Jan. 14, 1941 |
| 2,247,141 | Twyman | June 24, 1941 |
| 2,331,108 | DeGanahl | Oct. 5, 1943 |
| 2,527,943 | Lee | Oct. 31, 1950 |
| 2,597,086 | Morrow | May 20, 1952 |
| 2,614,743 | Arps | Oct. 24, 1952 |
| 2,618,121 | Tucker | Nov. 18, 1952 |
| 2,742,216 | Arps | Apr. 17, 1956 |